(12) United States Patent
Troennberg

(10) Patent No.: US 8,388,480 B2
(45) Date of Patent: Mar. 5, 2013

(54) TORQUE DISTRIBUTING DRIVE MECHANISM FOR MOTORIZED VEHICLES

(75) Inventor: Gabriel Troennberg, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 528 days.

(21) Appl. No.: 12/688,387

(22) Filed: Jan. 15, 2010

(65) Prior Publication Data

US 2010/0234162 A1  Sep. 16, 2010

(30) Foreign Application Priority Data

Jan. 16, 2009 (GB) .................................. 0900704.8

(51) Int. Cl.
*F16H 48/30* (2006.01)
(52) U.S. Cl. ........................ 475/150; 475/903
(58) Field of Classification Search .............. 475/5, 150, 475/204, 331, 903
See application file for complete search history.

(56) References Cited

U.S. PATENT DOCUMENTS

| | | | | |
|---|---|---|---|---|
| 3,503,281 A | * | 3/1970 | Gsching et al. ................. | 475/32 |
| 5,484,348 A | * | 1/1996 | Brown et al. .................. | 475/248 |
| 7,404,782 B2 | * | 7/2008 | Kudoh et al. .................. | 475/337 |
| 8,277,350 B2 | * | 10/2012 | Ai et al. ............................ | 475/5 |
| 8,287,413 B2 | * | 10/2012 | Besnard et al. ..................... | 475/5 |
| 2007/0087889 A1 | * | 4/2007 | Rosemeier et al. ........... | 475/205 |
| 2007/0249456 A1 | * | 10/2007 | Meixner ........................ | 475/150 |
| 2008/0009380 A1 | * | 1/2008 | Iwanaka et al. .................... | 475/5 |
| 2008/0227576 A1 | * | 9/2008 | Besnard et al. .................... | 475/5 |
| 2012/0083384 A1 | * | 4/2012 | Ziemer et al. ................. | 475/331 |
| 2012/0088628 A1 | * | 4/2012 | Ziemer et al. ................. | 475/331 |

FOREIGN PATENT DOCUMENTS

| | | |
|---|---|---|
| CZ | 302542 | 7/2011 |
| DE | 102005040253 B3 | 5/2007 |
| JP | 2006057745 A | 3/2006 |
| WO | 2008141887 A1 | 11/2008 |

* cited by examiner

*Primary Examiner* — David D Le
*Assistant Examiner* — Huan Le
(74) *Attorney, Agent, or Firm* — Ingrassia Fisher & Lorenz, P.C.

(57) ABSTRACT

A torque distributing drive mechanism is provided for transmitting torque to at least a first and a second output member. In addition, a motorized vehicle is provided that is equipped with such a torque distributing device. The device includes, but is not limited to a planetary gear set coupled to the first output member and coupled to the second output member, and an auxiliary drive member coupled to a carrier of the planetary gear set for inducting counter-directed offset torques to the first and second output member.

16 Claims, 1 Drawing Sheet

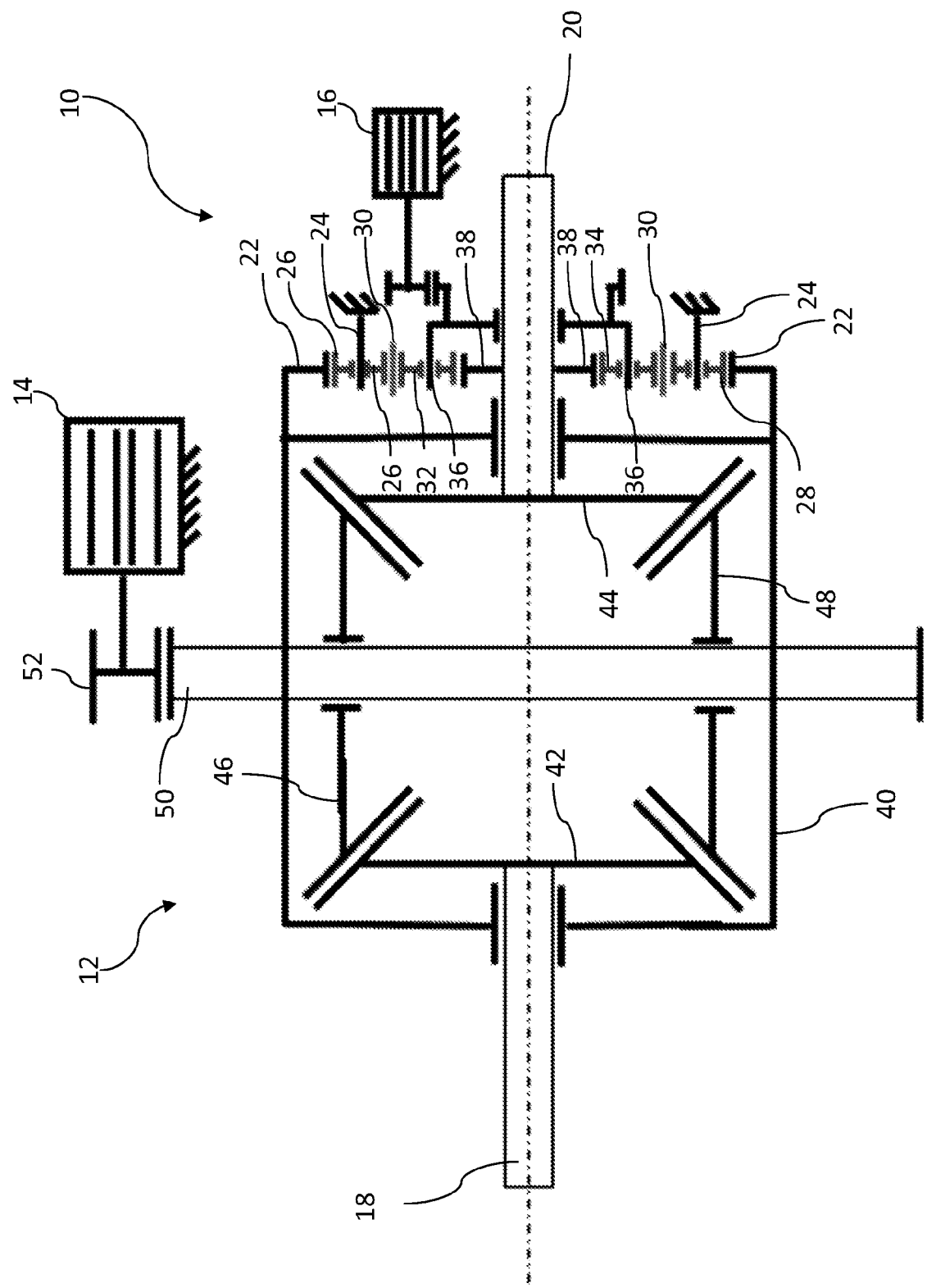

TORQUE DISTRIBUTING DRIVE MECHANISM FOR MOTORIZED VEHICLES

CROSS-REFERENCE TO RELATED APPLICATION

This application claims priority to British Patent Application No. 0900704.8, filed Jan. 16, 2009, which is incorporated herein by reference in its entirety.

TECHNICAL FIELD

The present invention relates to torque distributing drive mechanisms for motorized vehicles for differentiating and distributing torque between left and right wheels of a driven or non-driven vehicle axle. The invention further relates to motorized vehicles equipped with such torque distributing drive mechanism.

BACKGROUND

In modern drive systems, such as power trains for motorized vehicles, torque vectoring and active-yaw becomes more and more prominent. With active-yaw-systems or torque-vectoring systems, torque is selectively unevenly distributed to the left and right wheel of a vehicle axle. In order to manipulate angular yaw acceleration of the vehicle, electronically controlled active-yaw or torque-vectoring systems therefore provide a kind of steering effect that may provide improved vehicle stability.

In effect, active-yaw systems or torque-vectoring systems improve the vehicle's stability against understeering or oversteering. Hence, an arising yaw momentum can be counterbalanced by precisely dosed longitudinal forces on front and rear axle. In this way, a fully adjustable optimized lateral driving dynamics can be achieved.

Generally, active yaw-systems and torque-vectoring systems make use of branching off a certain amount of torque from a propulsion drive mechanism. The branched off torque is then distributed unevenly to left and right wheels of a vehicle axle. Typical existing solutions include transmission gears between a left and a right wheel of an axle, wherein respective drive shafts of the transmission gears are to be coupled with the propulsion drive or with respective wheels by means of numerous clutches.

Almost any active-yaw-system or torque-vectoring-system makes use of such a torque branching off. In this way torque can be added to a selected wheel or to a selected axle always at the expense of the overall available propulsion of respective wheels or axles. Such a solution is for examples illustrated in DE 10 2005 040 253 B3. It is characterized by two clutches, whose outer parts are axially tensed by means of a bridging element. Implementation of such an active yaw or torque-vectoring system is generally quite elaborate in construction and cost-intensive in production. Also, the uneven distribution of torque is always at the expense of the general propulsion of a driven axle.

It is therefore at least one object of the present invention to provide an improved torque distributing drive mechanism for transmitting torque to at least a first and a second output member. The torque distributing drive mechanism should provide a better performance and a simplified internal structure, which is easy to assemble and to manufacture. Further, the torque distributing drive mechanism should be inexpensive in production and assembly and should provide a high degree of reliability. In addition, other objects, desirable features, and characteristics will become apparent from the subsequent summary and detailed description, and the appended claims, taken in conjunction with the accompanying drawings and this background.

SUMMARY

The present invention provides a torque distributing drive mechanism for transmitting torque to at least a first and a second output member, wherein a planetary gear set is operably coupled to the first output member and is further operably coupled to the second output member. First and second output members are thus coupled to each other by means of the planetary gear set.

The torque distributing drive mechanism further comprises an auxiliary drive member, which is operably coupled to the planetary gear set for the purpose of inducing or inducting of counter-directed offset torques to first and second output members. The auxiliary drive member is therefore coupled to a carrier of the planetary gear set.

Since the first and the second output members are mechanically coupled by means of the planetary gear set, activation of the auxiliary drive member typically leads to an increase of torque at the first output member, while the second output member experiences a respective counter or oppositely directed torque, typically of comparable magnitude.

Depending on the specific implementation of the auxiliary drive member, it is also conceivable, that the second output member experiences a torque increase, while the torque of the first output member decreases when the auxiliary drive member is activated. Torque generated by the auxiliary drive member is this added to the first output member and subtracted from the second output member.

If both output members are designed as drive shafts of a driven axle of a vehicle, for instance as left and right wheel axle, by making use of the auxiliary drive member, the right wheel will for instance gain torque, whereas the left wheel's torque will decrease.

Since the drive mechanism comprises an auxiliary drive member that generates torque to be superimposed and to be coupled to the first and second output members, a torque difference in first and second output members can be generated and applied irrespective and independent of a general propulsion mechanism, which is for instance adapted to drive first and second output members, e.g. drive shafts of a driven axle.

Moreover, since the auxiliary driver member generates an auxiliary torque for the sole purpose of active-yaw or torque-vectoring applications, implementation of a torque branch-off is no longer required.

According to a first preferred embodiment, the offset torque to be generated by the auxiliary drive member is almost equally split into a first and a second offset torque. The mechanical coupling of first and second planetary gear sets, the auxiliary drive member and first and second output members is designed such, that the total offset torque to be generated by the auxiliary drive member almost entirely and equally splits into first and second offset torques. While the first offset torque is supplied to the first output member, the second offset torque is supplied to the second output member.

Preferably, these first and second offset torques are diametrically opposite to each other. In a torque vectoring implementation for motorized vehicles, a right wheel will therefore be supplied with the first offset torque, while the respective left wheel will be supplied with the second offset torque. Since first and second offset torques are opposite in direction, the total torque of the right wheel and the total torque of the left wheel substantially differ by the offset torque provided by the auxiliary drive member.

According to another embodiment, the planetary gear set comprises two planetary carriers, an inner carrier and an outer carrier. The two carriers are typically arranged in a nested or convoluted, hence co-axial way. Typically, the inner carrier is entirely disposed inside the outer carrier. It is therefore entirely enclosed by the outer carrier. The auxiliary drive member is coupled to only one of the two planetary carriers in order to induct a torque offset between the inner and the outer carrier of the planetary gear set.

According to a further preferred embodiment, both, the inner carrier and the outer carrier each rotatably support a set of planetary gears that mesh with a coupling ring. The coupling ring is disposed between the inner and the outer carrier and hence between the planetary gears of inner and outer carriers. By means of the coupling ring, a mechanical coupling between outer and inner carrier is achieved.

It is further of advantage, when the planetary gears of the outer carrier are configured to mesh with an outer gearing of the coupling ring, while the planetary gears of the inner carrier mesh with an inner gearing of the coupling ring. The planetary gears of inner and outer carriers are rotatably supported on shafts, fixed to the respective carriers.

By means of this convoluted and nested arrangements of outer carrier, coupling ring and inner carrier, a rotative movement of either outer carrier or its planetary gears leads to a respective rotative movement of the coupling ring.

A rotative movement of the coupling ring further leads to a counter or oppositely directed rotational movement of the planetary gears of the inner carrier and/or the inner carrier itself. Furthermore, any of the components, inner carrier, coupling ring or outer carrier can be mechanically fixed. In any of such configurations, the rotational movements of the residual moveable components are opposite with respect to each other.

In a further preferred embodiment, the planetary gears of the inner carrier mesh with a sun gear of the planetary gear set.

Furthermore, it is of advantage, when the planetary gears of the outer carrier mesh with an outer ring gear of the planetary gear set. The planetary gear set therefore comprises a single sun gear as well as a single outer ring gear. Instead of a single planetary carrier it further comprises two nested or convoluted carriers with respective planetary gears, meshing with an intermediate coupling ring.

In a further preferred embodiment, the outer ring gear of the planetary gear set is coupled to the first output member and the sun gear of the planetary gear set is coupled to the second output member. In this way, by inducting a relative torque between inner and outer carriers, also the first and second output members become subject to a respective counter-directed torque offset.

Furthermore, according to another preferred embodiment of the invention, the auxiliary drive member is coupled to one of inner or outer carriers, whereas the other carrier, outer or inner carrier is rotationally fixed. Preferably, the auxiliary drive member is coupled to the inner carrier and the outer carrier is rotationally fixed. But also an inverse implementation with a fixed inner carrier and an outer carrier rotationally coupled to the auxiliary drive member is within the scope of the present invention.

By keeping one of the planetary carriers fixed and by coupling the other carrier to the auxiliary drive member, a torque difference between the inner and outer carrier can be induced, exclusively by activation of the auxiliary drive member. In this way, a torque difference at first and second output members, hence left and right wheels of a vehicle, can be selectively provided by the auxiliary drive member, even irrespective of the overall angular velocity of the first and second output members.

Furthermore, the torque generated by the auxiliary drive member can be directly transferred to first and second output members irrespective of their state of motion or state of rotation. Hence, torque-vectoring and the uneven distribution of torque to first and second output members can be generated and provided independent on whether first and second output members are subject to an otherwise induced rotation or not.

Speaking in terms of drive shafts of a vehicle axle, an uneven distribution of torque can even be supplied to a non-moving vehicle, thus leading to a kind of skid steering or differential steering, wherein for instance a right wheel rotates clockwise and a left wheel rotates in opposite direction, hence counter-clockwise. By means of such a steering supporting torque-vectoring, even the turning radius of a vehicle can be decreased.

By making use of the inventive planetary gear set, the auxiliary drive member only has to provide a rather low angular velocity being proportional to the difference in angular velocity between the first and the second output member. In this way, a torque generated and provided by the auxiliary drive member is typically evenly split into a positive and negative torque offset to be superimposed and inducted to first and second output members, irrespective and independent of their overall angular velocity.

Furthermore, since the auxiliary drive member is exclusively designed for the torque vectoring purpose, already low power consumption, in the region of no more than a few kW is already sufficient to provide a torque difference of several hundreds of Nm as offset torque to the first and second output members.

According to a further preferred embodiment, the first and second output members are also coupled to an input differential gear. The input differential provides an input torque, for instance for driving or braking of a vehicle. The input differential can be of arbitrary type. It may be particularly designed to equally transfer an input torque, which is e.g. provided by a propulsion shaft, to first and second output members. The input differential may therefore be coupled to an engine-driven power train.

In a further embodiment, the outer ring gear of a planetary gear set is coupled to a differential carrier of the input differential. Additionally, the sun gear of the planetary gear set can be coupled to a pinion of the input differential. In this way, if for instance no substantial torque is applied and provided by means of the auxiliary drive member, the first and second output members will be supplied with almost equal torque by means of the input differential.

If a vehicle for instance drives straight on, the differential carrier and the outer ring of the planetary gear set will rotate with the same velocity than first and second output members. In such a situation, the planetary gears of the outer carrier that are rotatably supported on the fixed outer carrier will rotate accordingly.

Their rotation is then transferred to the coupling ring, which in turn meshes and rotates with the planetary gears of the inner carrier. Since the second output member is rigidly coupled with the sun gear meshing in turn with the planetary gears of the inner carrier, the second output member and the differential carrier will rotate at the same rate as long as the auxiliary drive member does not superimpose a counter directed torques to inner and outer planetary carrier.

Since the outer ring gear of the planetary gear set is coupled to the differential carrier and to the first output member and since the second output member is rigidly coupled to a pinion of the input differential and to the sun gear of the planetary gear set, a torque provided by the auxiliary drive member is thus superimposed to first and second output members irrespective and independent of overall angular velocity of the input differential's carrier.

Hence, a torque provided by the auxiliary drive member may almost equally split and may be superimposed as positive and negative offset torque to first and second output members.

According to a further preferred embodiment, all components of the planetary gear set, inner carrier, outer carrier, planetary gears, coupling ring, outer ring gear and sun gear are arranged in a common transverse plane. In this way, implementation of the drive mechanism only requires minimal space in axial direction.

In typical embodiments, the radial dimensions of the planetary gear set are comparable to the radial dimensions of the differential carrier of the input differential. Preferably, the outer ring gear of the planetary gear set can be integrally formed with the differential carrier or with the differential housing.

According to a further preferred embodiment, the auxiliary drive member comprises an electric or hydraulic motor. Hence, the auxiliary drive member is adapted to operate independent of a vehicle's general power train adapted to serve as propulsion for driving the first and second output members unidirectional.

Since the auxiliary drive member is decoupled from the general propulsion or power train of the vehicle and thus serves as a separate drive mechanism to exclusively provide torque vectoring, the offset or auxiliary torque generated by the auxiliary drive member is superimposed to the first output torque of the first output member and at the same time a counter-directed torque of substantially the same magnitude is supplied to the second output member.

Additionally and alternatively, torque superposition and torque subtraction can be arbitrarily applied always in opposite directions to both, first and second output members, depending on the actual driving situation of the vehicle.

According to a further embodiment of the invention, the auxiliary drive member is adapted to vary magnitude and direction of the offset torque to be inducted to first and second output member. Especially when designed as electric or hydraulic motor, the magnitude of the offset torque can be precisely controlled. In this way, it is generally not necessary to provide a clutch mechanism for controlling the superposition or subtraction of torque to or from first and second output members.

In a further preferred embodiment, the auxiliary drive member can be switched into a locking mode, in which the inner carrier is rotatably locked by means of the auxiliary drive member.

If the auxiliary drive member is rotatably locked or blocked, the entire planetary gear will turn into a rigid coupling device. In this configuration, the ring gear and the sun gear of the planetary gear will be rotationally locked; hence they will rotate with a fixed transmission as governed by planetary gears. In this way, the planetary gear serves to provide a differential locking device on demand. Since in locking mode, the auxiliary drive member serves to inhibit any relative rotational movement of first and second output member In a further aspect, the present invention also provides a motorized vehicle equipped with the above-described torque distributing drive mechanism. In typical embodiments, first and second output members of the torque distributing drive mechanism are designed as half shafts of a vehicle's driven axle, wherein the input differential is connected to e.g. a combustion engine-driven power train.

In this way, first and second output members are coupled and connected to left and right wheels of a vehicle's front and/or rear axle.

In further additional or alternative embodiments, it is also conceivable to connect first and second output members to the front and rear axle of a vehicle, in order to provide uneven torque distribution to a vehicle's front and rear axle.

BRIEF DESCRIPTION OF THE DRAWINGS

The present invention will hereinafter be described in conjunction with the following drawing figures, wherein like numerals denote like elements, and:

FIG. 1 schematically shows the torque distributing drive mechanism in a cross-sectional illustration.

DETAILED DESCRIPTION

The following detailed description is merely exemplary in nature and is not intended to limit application and uses. Furthermore, there is no intention to be bound by any theory presented in the preceding background or summary or the following detailed description.

The torque distributing drive mechanism according to FIG. 1 is typically to be implemented with a driven axle of a vehicle, wherein a left half shaft 18 is connected to a left wheel and wherein a right half shaft 20 is connected to a right wheel. The two half shafts 18, 20 serve as first and second output members of an input differential 12, which is to be connected and coupled to a primary drive 14.

This primary drive 14 can be implemented as combustion engine or by any other suitable drive means, such as an electric motor. The output gear 52 of the primary drive 14 is coupled to an input gear 50 of the differential 12.

The input differential 12 is designed as bevel differential, having a side gear 42 connected to the first drive shaft 18 and having a second side gear 44 connected to the second drive shaft 20. The pinion gears 46, 48 of the differential 12 are rotatably supported on shafts that are fixed to the carrier 40.

In a typical driving mode, the primary drive 14 supplies a propulsion torque, which is substantially evenly split to the two drive shafts 18, 20 in order to drive the vehicle.

The torque distributing drive mechanism comprises a kind of double planetary gear 10 that has two nested or convoluted planetary carriers 20, 36. In the cross-sectional illustration of FIG. 1, the outer planetary carrier 24 rotatably supports a pair of planetary gears 26, 28 and the inner carrier 36 rotatably supports planetary gears 32, 34. Additional planetary gears are not explicitly illustrated due to the cross-sectional view.

In the shown embodiment, the outer carrier 24 is rotatably fixed and the inner carrier 36 is rotatably coupled to an auxiliary drive member 16. Furthermore, the planetary carriers 24, 36 are coupled by means of their respective planetary gears 26, 28, 32, 34 and by means of an intermediate coupling ring 30 comprising cogs or gearings on its radially outer and inner surfaces.

Radially adjacent planetary gears 26, 28, 32, 34 rotatably mesh with the inner and outer gearing of the coupling ring 30. In this way, the planetary gears 26, 28, 32, 34 and their supporting planetary carriers 24, 36 are rotatably engaged and coupled.

The planetary gear set 10 further comprises an outer ring gear 22 that is rigidly connected to the differential carrier 40 of the differential 12. A rotational movement of the differential carrier 40, e.g., induced by the primary drive 40, leads to a rotational movement of the outer ring. Since the outer carrier 24 of the planetary gear set 10 is rotatably fixed, also its planetary gears 26, 28 rotatably supported on shafts rigidly connected to the outer carrier 24 remain at their position but rotate around said shafts.

Consequently, the coupling ring 30, that meshes with the planetary gears 26, 28 of the outer carrier 24, rotates in an opposite direction compared to the rotation of the outer ring 22. In a similar way, the rotative movement of the coupling ring 30 transfers to the planetary gears 32, 34 of the inner carrier 36.

If no additional torque is provided by the auxiliary drive member 16, also the inner carrier 36 remains in a resting or idle position. Consequently, the rotative movement of the inner planetary gears 32, 34 transfers to the sun gear 38, which is rigidly connected to the drive shaft 20.

In such instances, in which the auxiliary drive member 16 does not provide an offset or additional torque, the two output members 18, 20 and the differential carrier 40 will rotate substantially at the same angular velocity.

As soon as the auxiliary drive member 16, which is preferably implemented as electric or hydraulic motor, inducts a torque to the inner carrier 36, the corresponding torque difference between inner carrier 36 and outer carrier 24 of the planetary gear set 10 will be transferred in opposite directions to first and second output member 18, 20.

The torque generated and provided by the auxiliary drive member 16 is thus proportional to the difference of first and second output member's torque, independent and irrespective of the torque provided by a primary drive member 14.

In this way, a torque vectoring or active-yaw system can be provided, that supplies well-defined and exact levels of vectoring torque, regardless of the angular velocity of first and second output members 18, 20 and regardless of the vehicle velocity. At the same time, the power provided by the auxiliary drive member 16 can almost entirely be transferred to the torque vectoring purpose. At the same time, the general propulsion and/or braking system, provided by the primary drive 14 and the input differential 12 is not affected by the torque vectoring or torque distributing planetary gear set 10.

Furthermore, it has turned out, that a power of a few kW of the drive member 22 is already sufficient to generate torque offset of several hundred Nm at the output members 18, 20.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A torque distributing drive mechanism for transmitting torque to at least a first output member and a second output member, comprising:
    a planetary gear set comprising an inner carrier and an outer carrier, the planetary gear set coupled to the first output member and coupled to the second output member; and
    an auxiliary drive member coupled to one of the inner carrier and the outer carrier of the planetary gear set for inducting counter-directed offset torque to the first output member and the second output member,
    wherein the inner carrier and the outer carrier each comprise a set of planetary gears that mesh with a coupling ring.

2. The torque distributing drive mechanism according to claim 1, wherein the set of planetary gears of the outer carrier are configured to mesh with an outer gearing of the coupling ring while the set of planetary gears of the inner carrier are configured to mesh with an inner gearing of the coupling ring.

3. The torque distributing drive mechanism according to claim 1, wherein the auxiliary drive member is coupled to the inner carrier and the outer carrier is rotationally fixed.

4. The torque distributing drive mechanism according to claim 1, wherein components of the planetary gear set include the inner carrier, the outer carrier, the planetary gears of the inner carrier and the planetary gears of the outer carrier, the coupling ring, an outer ring gear, and a sun gear, and wherein the components of the planetary gear set are arranged in a common transverse plane.

5. The torque distributing drive mechanism according to claim 1, wherein the auxiliary drive member is adapted to vary magnitude and direction of the counter-directed offset torque.

6. The torque distributing drive mechanism according to claim 1, wherein the counter-directed offset torque generated by the auxiliary drive member is substantially equally split into a first offset torque and a second offset torque that are supplied to the first output member and the second output member, and wherein the first offset torque and the second offset torque are diametrically opposed.

7. The torque distributing drive mechanism according to claim 6, wherein an auxiliary torque generated by the auxiliary drive member is superimposed to the first offset torque of the first output member and subtracted from the second offset torque of the second output member.

8. The torque distributing drive mechanism according to claim 1, wherein the set of planetary gears of the inner carrier are configured to mesh with a sun gear of the planetary gear set.

9. The torque distributing drive mechanism according to claim 8, wherein an outer ring gear of the planetary gear set is coupled to the first output member and the sun gear of the planetary gear set is coupled to the second output member.

10. The torque distributing drive mechanism according to claim 9, wherein the first output member and the second output member are coupled to an input differential.

11. The torque distributing drive mechanism according to claim 10, wherein the outer ring gear of the planetary gear set is coupled to a differential carrier of the input differential and the sun gear of the planetary gear set is coupled to a pinion gear of the input differential.

12. A motorized vehicle, comprising:
    an axle;
    a first wheel coupled to the axle;
    a second wheel coupled to the axle;
    a torque distributing drive mechanism, comprising:
        a planetary gear set comprising an inner carrier and an outer carrier, the planetary gear set coupled to a first output member and coupled to a second output member; and
        an auxiliary drive member coupled to one of the inner carrier and the outer carrier of the planetary gear set for inducting a counter-directed offset torque to the first output member and the second output member, wherein the inner carrier and the outer carrier each comprise a set of planetary gears that mesh with a coupling ring, and wherein the first output member and the second output member are coupled to the first wheel and the second wheel that are coupled to the axle.

13. The motorized vehicle according to claim 12, wherein the counter-directed offset torque generated by the auxiliary drive member is substantially equally split into a first offset torque and a second offset torque that are supplied to the first output member and the second output member, and wherein the first offset torque and the second offset torque are diametrically opposed.

14. The motorized vehicle according to claim 12, wherein the set of planetary gears of the outer carrier are configured to mesh with an outer gearing of the coupling ring while the set of planetary gears of the inner carrier are configured to mesh with an inner gearing of the coupling ring.

15. The motorized vehicle according to claim 12, wherein the set of planetary gears of the inner carrier are configured to mesh with a sun gear of the planetary gear set.

16. The motorized vehicle according to claim 15, wherein an outer ring gear of the planetary gear set is coupled to the first output member and the sun gear of the planetary gear set is coupled to the second output member.

* * * * *